United States Patent [19]

Shvakhman et al.

[11] Patent Number: 4,581,864
[45] Date of Patent: Apr. 15, 1986

[54] WATERPROOFING UNIT

[76] Inventors: Lidia Shvakhman, c/o 19 Holling Dr., Buffalo, N.Y. 14216; Ignatius T. Agro, 492 West Ave., Buffalo, N.Y. 14213; Louis L. Chiusolo, 230 Glenwood Cres., Oshawa, Ontario, Canada

[21] Appl. No.: 535,379

[22] Filed: Sep. 23, 1983

Related U.S. Application Data

[63] Continuation-in-part of Ser. No. 498,482, May 26, 1983, Pat. No. 4,514,538.

[51] Int. Cl.[4] .......................... B32B 3/12; E02D 19/18
[52] U.S. Cl. ................... 52/169.14; 52/309.4; 52/309.14; 106/DIG. 4; 427/180
[58] Field of Search ............ 52/169.14, 173 R, 309.4, 52/309.14; 106/89, 97, 110, DIG. 4; 427/180; 277/227; 425/463

[56] References Cited

U.S. PATENT DOCUMENTS

| | | | |
|---|---|---|---|
| 3,561,177 | 2/1971 | Agro et al. | 52/169.4 X |
| 3,676,198 | 7/1972 | McGroarty | 427/180 |
| 4,259,057 | 3/1981 | Abe et al. | 106/DIG. 4 X |
| 4,316,833 | 2/1982 | McGroarty | 523/177 |
| 4,443,019 | 4/1984 | Ishido et al. | 277/227 |

Primary Examiner—John E. Murtagh
Assistant Examiner—Richard E. Chilcot
Attorney, Agent, or Firm—James J. Ralabate

[57] ABSTRACT

A waterproofing unit adapted to be positioned against a structure to be protected comprising a grid sheet and a waterproofing composition disposed within the grid. The composition is a film forming material which is self-sustaining.

8 Claims, 8 Drawing Figures

U.S. Patent    Apr. 15, 1986    4,581,864
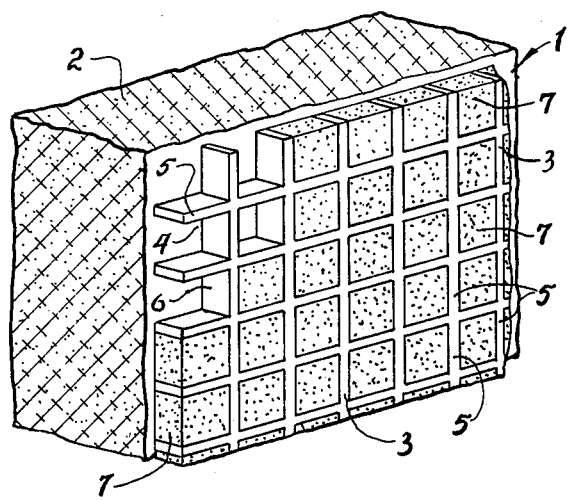
Fig. 1
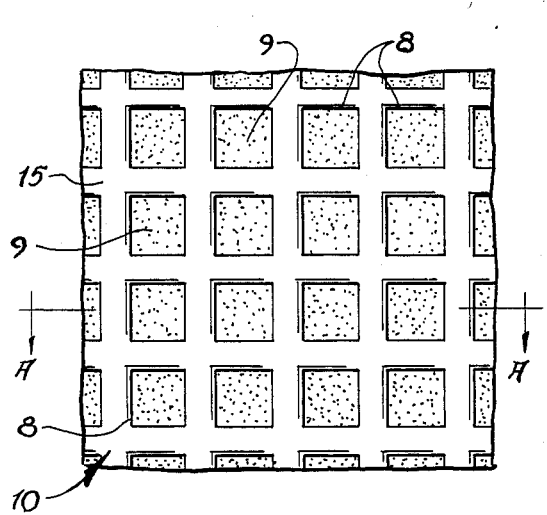
Fig. 2
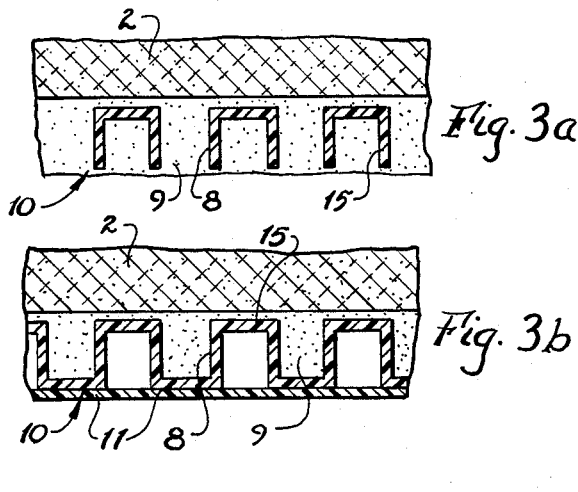
Fig. 3a
Fig. 3b
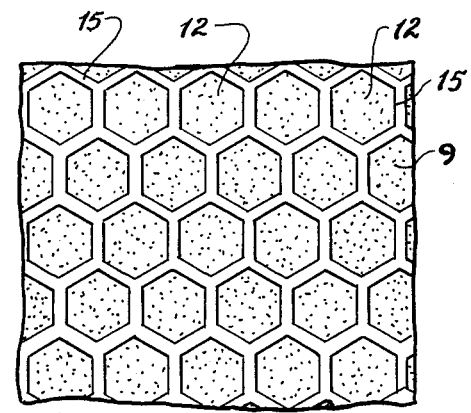
Fig. 4
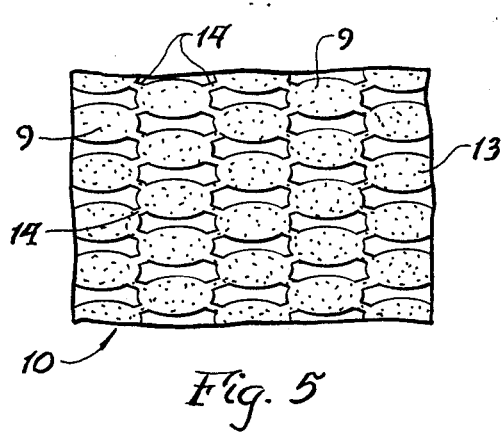
Fig. 5
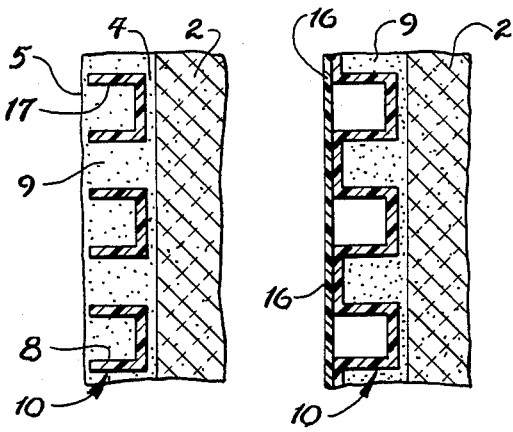
Fig. 6    Fig. 7

WATERPROOFING UNIT

This invention relates to a novel structure useful in the building industry and more particularly to a novel waterproofing product. This application is a continuation in part of application Ser. No. 06/498,482 filed in the U.S. Patent and Trademark Office on May 26, 1983, now U.S. Pat. No. 4,514,538 issued Apr. 30, 1985.

BACKGROUND OF THE INVENTION

The use of bentonite and bentonite-containing materials in the waterproofing art is known. Bentonite is a mineral in the clay family, and is mined in the areas of the Midwestern United States, Western Wyoming, Eastern Montana, Canada and other areas in North America. Bentonite is sodium montmorillonite and has the ability to swell to at least 12 times its volume when wetted with water. It is designated chemically as $Al_2O_3.4SiO_2.H_2O$ and is generally found as a hydrated aluminum silicate clay found in the areas noted above. The montmorillonite clays are primarily composed of four elements: silicon, oxygen, aluminum and hydrogen. If observed through an electron microscope, the bentonite molecules appear very similar to a series of stacked dishes. Each stack is held together by electrical charges. The orientation of the elements within the structure cause the plates to exhibit positive and negative charges along their surface. When in contact with water, part of the charge is extended to the water molecule. As a result, the water molecules orient themselves on the bentonite plates. These molecules neutralize some of the electrical charges resulting in an unbalanced electrical state. To correct this, the plates move further apart thus initiating a swelling and gelling action. This gelling inhibits the further penetration of water. In effect, bentonite uses water to stop water. Once the bentonite has been hydrated (wetted) and reached its gelled form, trying to force additional water into it results in an action much like a ball valve. The harder one presses on the valve, the tighter the valve is closed. This is the reason bentonite will withstand tremendous water pressure without leaking.

Underground, bentonite once wetted, will remain in its gel state as long as 50% relative humidity of the soil is maintained. Bentonite that has been allowed to dry will re-wet and re-gel as soon as moisture is present. There is no other waterproofing raw material which, on first contact with water, exhibits these desirable characteristics.

Various products containing bentonite have been used to waterproof selective structures. U.S. Pat. No. 3,445,322 discloses a waterproofing laminate for preventing water seepage that utilizes a porous casing member having compartments in the laminate for holding bentonite clay. This prior art patent teaches the use of a waterproofing structure consisting of a layer of ground bentonite clay, a casing of permeable material to contain the bentonite and also permit water or other liquid to contact the bentonite to activate its water-impeding characteristics and an impervious membrane for retaining the bentonite clay in its intended orientation relative to a structure to be waterproofed. In this known configuration, the impervious membrane is selectively perforated or opened to permit a controlled amount of water to penetrate or wet the bentonite. This membrane is made from a tough material to prevent any large deterioration of the bentonite clay. Thus, the structure is a sandwich arrangement having bentonite between two layers or facings, one a water pervious layer and the other a water impervious layer. While this structure has utility, it requires two containing faces or layers be used with the bentonite. Also, it is relatively expensive to manufacture and complex to assemble or manufacture.

In using waterproofing compositions, it is important to utilize compositions having maximum waterproofing properties. In known compositions, putty-like masses are formed from bentonite having added thereto from 100 to about 150 parts water for each 100 parts bentonite. The resulting pre-swelled materials have already used up part of their water-absorbing properties and are thus not mass-effect efficient. About 30% of the bentonite used is rendered relatively ineffective because of the necessary pre-swelling as a result of the partial initial hydration. An embodiment similar to this preswelled composition is disclosed in U.S. Pat. No. 2,277,286.

Other compositions utilize bentonite gels containing in addition to the bentonite clay a non-aqueous liquid and a gelling agent. The base of the waterproofing composition is a non-aqueous medium with agar agar. The non-aqueous medium could be oil, glycerine, or an alcohol. The non-aqueous liquid usually could comprise up to 85% by weight of the total composition, and the gelling agent is added in amounts of from 15-60%. The range left for the bentonite clay usually is from about 30% to 70% by weight of the total bentonite composition. This means that from about 30% to 70% of the waterproofing composition is non-waterproofing in nature, because of the necessary addition of materials to maintain the cohesiveness of the material. These materials have been used as waterproofing compositions having the consistency of modeling clay or in the alternative, can be applied over the face or surface of a water permeable support sheet such as corrugated paperboard. In either embodiment, the compositions contain a significant amount of non-functional waterproofing ingredients. Compositions similar to these are disclosed in U.S. Pat. Nos. 4,279,547 and 2,065,512.

The prior art, therefore, provides waterproofing materials, or paste-like masses, that are water pre-swelled, thus losing effectiveness, and diluted in content in final composition, thus again further losing effectiveness.

Other systems comprise the use of membranes supports or casings to contain the waterproofing compositions. The casing of water permeable material contains the bentonite waterproofing composition and permits water or other liquids to pass therethrough and contact the bentonite. Upon contact, the water activates the water impeding characteristics of the bentonite composition. On the opposite face of the bentonite containing composition is a water impervious membrane designed in a predetermined pattern for retainin'g the bentonite material in its intended position. The water impervious membrane is necessary to prevent the rupture of the permeable face or sheathing and to prevent loss of the bentonite material before activation.

Various water permeable support sheets have been used such as those disclosed in U.S. Pat. No. 4,279,547 and above-described U.S. Pat. No. 3,445,322. These water permeable sheets contain the bentonite composition and also permit water to contact this composition to activate its water impeding characteristics. Not only is it relatively expensive to manufacture these waterproofing components, but also the surface contact with the actual waterproofing material is reduced substantially. The prior art sheets or building components usually comprise a waterproofing material sandwiched between a water impervious backing material on one face and a water pervious facing layer on the other face. The containing structures consist of a plurality of compartments into which the composition is housed, part of the area of the component face consists of the water impervious material and the remainder waterproofing composition. Irrespective of the configuration or design of the component, the waterproofing area that contacts the inner face of the water pervious layer is substantially less than maximum area. This is because the receptacles that contain the waterproofing composition must by necessity take up part of this area. Various configurations are disclosed in U.S. Pat. Nos. 2,277,286; 3,445,322; 3,561,177; and 4,279,547.

A further serious problem in prior art waterproofing structures is that because of the cardboard or paperboard facings, the bentonite is not held firmly in place when in use. The cardboard outer and surface facings contain the bentonite materials in a sandwich-like configuration. The cardboard has an internally corrugated surface into which the bentonite fits and is maintained. However, upon becoming wet, the cardboard loses its holding capacity and the bentonite falls to the bottom of the sandwich-like structure and is thus not effective as a waterproofing agent. Once the bentonite is dislocated from its original position along the entire facing area, the waterproofing properties of the structure are lost. Further, when paperboard or cardboard are used as facings, the cardboard deteriorates in time and upon becoming wet, causes the bentonite to sag or fall. When this occurs, the waterproofing properties are seriously impaired at the stage where maximum waterproofing is desired, i.e., during water seepage or contact. Also, it is not unusual for the cardboard facing to easily puncture and allow the waterproofing material or bentonite to seep out of position. Again, this substantially reduces the total effectiveness of the waterproofing structure.

The prior art, therefore, provides structures and systems for waterproofing components having at least three major drawbacks:

(1) They are often water pre-swelled, thereby losing the preswelled portion effectiveness when activated in use by contact with water or liquids;

(2) They are often diluted with substantial amounts of other components such as gelling agents, dispersing agents, non-aqueous liquids, waxes, thickening agents and other relatively non-functional waterproofing ingredients;

(3) They are often used together with structures that have receptacles that impede or minimize the area contact of the waterproofing material with the surface structure to be waterproofed.

It is, therefore, an object of this invention to provide a waterproofing structure devoid of the above-noted disadvantages.

Another object of this invention is to provide a novel, self-sustaining waterproofing means that provides maximum material exposure to the structure to be waterproofed.

Still another object of this invention is to provide a waterproofing panel that is relatively inexpensive and yet more effective than heretofore-used structures.

Still another object of this invention is to provide a waterproofing structure that retains the bentonite in its original position and provides continuous maximum exposure of the bentonite to the object to be waterproofed.

Another still further object of this invention is to provide a novel waterproofing barrier arrangement which insures longevity of the water barrier.

Yet another object of this invention is to provide a waterproofing barrier which is capable of providing both improved thermal insulation and waterproofing to a structure to be waterproofed.

Another yet further object of this invention is to provide a barrier layer that is adapted to be positioned on the inside of masonry foundations and walls to provide waterproofing and thermal insulation thereto.

Still yet another object of this invention is to provide a novel waterproofing structure containing bentonite that is lightweight and easy to handle and manipulate.

Yet a further object of this invention is to provide a novel waterproofing structure containing a bentonite composition which retains its near full water absorbing properties and also provides optimum surface exposure to the structure to be waterproofed.

Another further object of this invention is to provide either a rigid or flexible waterproofing structure that can meet any waterproofing needs.

The foregoing objects and others are accomplished in accordance with this invention by providing a novel waterproofing means having a containing or retaining structure comprising a foam or grid that has a grid or pore network of through-compartments. Into this grid is deposited a composition comprising: (A) at least 75 parts or percent by weight of bentonite, (B) a binder or film-forming material selected from the group consisting of dialkylphthalate, dialkyloxalate, sucrose acetate isobutyrate, glycerine and mixtures thereof and (C) a material selected from the group consisting of polyalkylmethacrylate, cellulose acetate, polyvinylalcohol, polyvinylbutyral, and mixtures thereof.

The retaining grid may be of any suitable configuration having open faces, if desired, on both surfaces having one face open, or both faces covered with any suitable layer. The structure of this invention also includes a grid or a foam, or any porous plate having the above-defined composition deposited therein. The surfaces of the grid or foam or porous panel as noted above, may be both open, or opened on one surface, or closed on both surfaces but closed with a water pervious material. It is preferred, however, that the retaining structure have both surfaces open to provide maximum surface contact with the waterproofing composition contained therein. It is important that the composition deposited in each grid pocket or pore be in waterproofing relationship with the structure to be protected. This relationship can exist if the grid face is open, i.e. no layer or coating over it, or it could be covered by a water pervious layer that will permit water to have access to the waterproofing composition. The retaining structure could be made from any suitable material such as synthetics, wood or wood products such as paper, cardboard, corrugated asbestos paper, plastics such as polymers of organic or inorganic materials, rubber, or mixtures thereof. Materials such as cellular polystyrene, polyurethane, or other foam polymeric materials may be used. Grid materials of polyethylene, polystyrene, polyethylene terephthalate, polyamides, polyoxymethylene or any other suitable grid material may be used. Structural configurations disclosed in U.S. Pat. No. 3,561,177 may be used in this invention having both faces open, both faces closed, or one surface or face open. It is preferred that the compartments shown in U.S. Pat. No. 3,561,177 be in flow connection one with the other to provide a continuous surface layer of the bentonite material; this will be described in more detail with reference to the drawings. The cells or compartments should preferably be in contiguous relationship to each other for best results. Structures such as honeycomb configurations having connecting channels are particularly suitable for use in the present invention.

Specifics of the waterproofing composition are described in U.S. co-pending application Ser. No. 06/498,482 filed in the U.S. Patent and Trademark Office on May 26, 1983, of which this application is a continuation in part.

It is critical to this invention that the bentonite used be wetted with solvent prior to formulation. The purpose of the wetting is to coat the individual bentonite particles and thus provide uniform adhesion or to improve its adhesion qualities in the present formulation. This prewetting does not adversely affect the swelling properties of the bentonite for easy adhesion when formulated. If the bentonite is included in the formulation in its dry form or water-wetted form, substantially inferior results are obtained.

Any suitable bentonite composition may be used in the waterproofing formulation of this invention. Bentonite consists generally of $Al_2O_3.4SiO_2.H_2O$, and is a hydrated aluminum silicate clay found all over the world and one high quality, high swelling form is found in the Midwest of the U.S.A.

Any containing structure can be used as long as it is compatible with the solvent used.

Small amounts of alkaline substances if suitable may be added to the bentonite to increase its swelling properties. Bentonite compositions (prior to pre-swelling) such as those disclosed in U.S. Pat. Nos. 2,065,512; 2,277,286; 3,445,322; 3,561,177; and 4,279,547 may be used in the formulation of this invention. The bentonite is used in the present invention in an amount of at least 75 parts by weight of the total formulation. The second ingredient used in the formulation of this invention is a plasticizer member selected from the group consisting of a dialkylphthalate, dialkyloxalate, sucrose acetate isobutyrate, glycerine, and mixtures thereof in amounts of about from 0.1 to 6 parts or percent by weight of the final total composition. Any suitable polyalkylphthalate may be used if desired; however, it was found that use of dibutylphthalate resulted in preferred results. Without a plasticizer the composition will not function because of poor adhesive properties. Also with the use of a plasticizer the composition becomes more flexible and less rigid.

The third ingredient is at least one substance selected from the group consisting of a polyalkylmethacrylate, cellulose acetate, polyvinylalcohol, polyvinylbutyral, and mixtures thereof. This material is used in from about 0.1 to 8 parts or percent by weight of the final composition.

An ingredient present in making the composition and in the formulation is any suitable highly volatile solvent in amounts of from about 20 to 60 parts by weight. The binder material may be prepared from any thermoplastic synthetic resin base such as acrylic materials.

The bentonite material in the present formulation has substantially 100% expansive or swelling capability and is not diluted in various non-functional components such as swelling agents. The film forming organic formulation used with the bentonite provides a binder which carries the bentonite and forms a self-sustaining bentonite-binder layer. This film does not require any backing, framing or facing, and can be formed into self-sustaining sheets, rods, or other independent structures. This feature will be referred to as "self-sustaining" throughout this disclosure. The two open faces or sides of this layer structure permit maximum and direct exposure to the structure to be waterproofed. Of course, retaining structures may be used if desired.

The manufacture of the composition of this invention is relatively simple. Formulation is prepared at room temperature with no heating of the ingredients required. For purposes of this invention, a "suitable solvent" is defined as: a solvent having high volatile properties and typical solvents are: benzene, toluene, xylene, hesane, cyclohesanole, cyclohexane, methylcyclohesanole, dioxane, ethylacetate, acetone, amylacetate, propylacetate, methylethylketone, ethylcellosolve, isopropylalcohol, methanol, ethylalcohol and isoamylalcohol, etc.

If it is desired to use a backing material for some reason, any suitable substrate may be used such as synthetics, wood, polyethylene, styrofoam, polyurethane, metal, cloth, webbing, masonite, corrugated paperboard and Mylar. The resin content of the binder material should be sufficiently high to produce a high tack, high strength adhesive. Suitable binder materials include cellulose acetate, polyalkylacrylates, polyvinylalcohol, polyvinylbutyral, and mixtures thereof. A plasticizer may be incorporated into the binder material, if desired; however, the selected plasticizer should be compatible with the binder. Plasticizers that may be used are dibutylphthalate, dioctylphthalate, diethyloxalate, sucrose acetate isobutyrate, diisodecylphthalate, glycerine may be used successfully with polyalkylacrylate such as (poly-n-butyl methacrylate, polyethylmethacrylate, polymethylmethacrylate), cellulose acetate, polyvinyl alcohol, polyvinyl butyral. The plasticizers specified above decomposed completely and have an excellent softening effect on the binder. The volatile solvent should preferably dissolve binder and plasticizer without chemically reacting with the slurry. The solvent utilized to produce the slurry can be acetone, amyl acetate, ethyl alcohol, benzene, cyclohesanole or other above-noted highly volatile common solvents. The mixture of different solvents such as acetone and benzene, acetone and amyl acetate, ethyl alcohol, amyl acetate and benzene may also be used. For thin impregnated membranes, ethyl alcohol is an extremely useful solvent medium.

Slurry containing selected pre-wetted bentonite granules, binder, plasticizer and solvent is deposited onto honeycomb grids having two open faces or other suitable convolutions in a uniformly thick and smooth layer, dried by fan at room temperature of slightly higher temperature. It was found that several types of adhesives could be successfully used in combination with bentonite slurry. Such adhesives can be water base, solvent base or water or solvent base types. Using the specific compositions to make slurry flowable, the approximate ratio of the selected solvent relative to the bentonite will be ranged from 1:6 to 1:2. The proportions of the various slurry components are determined by several considerations. The selected bentonite granules constitutes from 75% to 98% be weight of the final composition. To obtain the desired tackiness and properties, the ratio of plasticized binder to bentonite must be selected within certain ranges, which will vary somewhat depending on the particle size of the bentonite and the properties of the binder and plasticizer. Actual amounts of the ingredients may be varied within wide ranges but the major proportion of bentonite is required. It was found that by changing ratio range between binder to plasticizer from 1:2 to 5:1, it would be able to produce low or high viscosity adhesive. Also it was found that using a combination of different binders or plasticizers may be very helpful.

The waterproofing composition of this invention is self-sustaining and can be made into a self-supporting structure such as boards, sheets, plates, rods, spikes, plates or other independent structures. If desired, it can be injected by force, it can be sprayed onto a sheet or wall, or any other backing structure to be used in waterproofing. Alternatively, if desired, it can be used in any of the prior art structures including those defined in U.S. Pat. Nos. 3,561,177; 3,455,322; 4,279,547; 2,065,512 and 2,277,286; without fear of collapse or disintegration of the bentonite containing material. The adhesive qualities of the present composition will facilitate holding the waterproofing composition firmly in position. Whenever water seepage occurs, the preferred open faced configuration containing the present composition will permit maximum exposure to the water and allow maximum expansion of the bentonite to cause it to swell and allow its enhanced water barrier action. An open grid structure such as honeycomb, having no facings on either side, can be filled with the present composition, and the composition being totally exposed on both faces of the honeycomb grid.

In another embodiment of this invention, a foam or thermal insulation such as polyurethane can be impregnated, sprayed, injected or vacuum applied with the present composition. The cells of the foam thereby will have the strongly adhesive composition containing unswelled bentonite, and this waterproofing bentonite composition cannot be washed or dislodged from these cells by the water contacting it. Upon contact, the bentonite composition will swell in its expandable medium of foam and provide the water barrier action needed. The present composition can be used to waterproof expansion joints, walls, mines, dams, masonry, construction, oil wells, pipes, building foundations, basement or any other item or structure requiring a waterproofing protection.

Any suitable bentonite can be used including bentonite materials useful in salt water and oil. Those bentonite materials are identified as G.P.G. bentonite, formulated by American Colloid Company; Skokie, Ill.

PREFERRED EMBODIMENTS OF THE INVENTION

A preferred formulation in making the composition of this invention is as follows:
Bentonite: 75–92 parts by weight
polybutylmethacrylate: 2.5–6 parts by weight
dibutylphthalate: 2–3 parts by weight
Benzene: 20–60 parts by weight A second preferred formulation in making the waterproofing composition of this invention comprises:
Bentonite: 75–92 parts by weight
dibutylphthalate: 1–2 parts by weight
Acetone: 10–15 parts by weight
Cellulose acetate: 1–5 parts by weight
diethyloxalate: 1–2 parts by weight
Benzene: 30–50 parts by weight The compositions of this invention can be prepared in one embodiment by mixing under reaction conditions about 85 parts of unswelled bentonite, with up to about 5 parts of cellulose acetate and up to about 6 parts of diethyloxalate plasticizer. This composition is then homogenized by continuous agitation for about 10 minutes. It could then be spread evenly on a substrate or can be used as a self-supporting structure.

The compositions of this invention can also be prepared by mixing:
Bentonite: 95–96 parts
Sucrose acetate isobutyrate: 4–6 parts
Polymethylmethacrylate: 3–5 parts
Alcohol-Isopropyl alcohol: 30–60 parts The composition of this invention may be used as a waterproofing composition alone or together whth an insulating frame, a substrate or a water impervious backing layer of any suitable material. In addition, it could be used, if desired, in any of the building components described in U.S. Pat. Nos. 3,561,177; 3,445,322; or 4,279,547. It is important to note, however, that the composition of this invention resides in a self-supporting layer that may be used as such without the need for supporting structures or backing.

BRIEF DESCRIPTION OF DRAWINGS

FIG. 1 is a perspective fragmentary view of the waterproofing element of this invention mounted against the wall of a structure to be waterproofed.

FIG. 2 is a side elevational view of the water proofing element of FIG. 1 with the waterproofing composition deposited therein.

FIG. 3a is a view partially in cross-section taken along the lines A—A of FIG. 2.

FIG. 3b is a view partially in cross-section, similar to FIG. 3a, but with one face or surface open and one surface with a water permeable layer.

FIG. 4 is a side elevational view of an alternative type of grid used in the waterproofing element of this invention.

FIG. 5 is a side elevational view of another alternative type of grid used in the waterproofing element of this invention.

FIG. 6 is an end elevational view of the waterproofing element of this invention having both faces or surfaces open and having the waterproofing composition deposited therein.

FIG. 7 is an end elevational view of the waterproofing element of this invention having one face or surface open and one surface with a water permeable facing layer.

DESCRIPTION OF THE PREFERRED EMBODIMENTS

The preferred embodiments of this invention are illustrated in the accompanying drawings and descriptions.

FIG. 1 shows a masonry wall 2 or structure to be waterproofed having the waterproofing element 1 of this invention mounted thereon or in close proximity therewith. Element 1 is fabricated from a grid or other containing structure 3 having an open face 4 abutting masonry wall 2 and an open face 5 on the surface facing away from wall 2. In the cups or pockets 6 of grid 3 is deposited the waterproofing composition 7 of this invention as described earlier in this disclosure. As water contacts the bentonite composition 7 will expand or swell and will provide a water barrier action or protection for wall 2. Since each individual cup or pocket 6 contains the bentonite waterproofing composition, this material will be held at fixed locations in the waterproofing element 1. In addition, because of the self-sustaining nature of the waterproofing composition 7, the bentonite will remain substantially in position thereby permitting substantially extensive and total coverage of the surface of wall 2 or other surface to be waterproofed.

FIG. 2 illustrates an embodiment of this invention wherein rectangular or square pockets 8 are provided for retaining the bentonite waterproofing material 9. The waterproofing material 9 may be coated on one side or face of the grid, or just internally in pockets 8. If desired, coatings can be provided on both sides; however, because of the self-sustaining nature of the waterproofing composition 9 and its resistance against deterioration, no backing or layer whatsoever is required. The grid 10 may be rigid or flexible and may have a porous or cellular structure or be a solid plastic or other suitable material. If it is cellular, the material 9 may be deposited in only the pockets 8 or in pockets 8 and cells both. The grid 10 can have any suitable thickness provided a sufficient amount of waterproofing material 9 can be deposited therein. Since material 9 is not granular but rather a cohesive composition containing large amounts of bentonite, a binder and plasticizer, it does not require a grid with any backing layer to hold composition 9 in place. Of course, if a backing layer is desired for any purpose, it may be used, but certainly is not necessary.

FIG. 3 illustrates the thickness of grid 10 of FIG. 2 with two different pocket configurations. In configuration A, pockets 8 have no backing but are continuously open through the thickness of grid 10. These pockets will be referred to as through compartments. The waterproofing material 9 therefore extends through the thickness of grid 10 and is exposed on both faces of the grid. The frame and network or grid work of grid 10 may be made of rigid or flexible material and preferably in sheet or layer form adapted to fit against a structure to be waterproofed as shown in FIG. 1. The A and B configurations shown in FIG. 3 would be similar to the thickness of FIGS. 4 and 5 except for the pocket configuration or design. In 3b, a water pervious grid 10 is shown having sinusoidal arrangement that can be curved or square as shown. Composition 9 is deposited in pockets 8 on one side only, but the back of pockets 8 have a water impervious backing enclosure 11. By the use of backing 11, the expansion of the bentonite when activated will all be against the structure 2 to be protected as shown. In either top views A or B, maximum surface exposure of composition 9 is provided for waterproofing contact with a surface to be protected.

FIG. 4 and 5 show alternate configurations to the lattice work or grid network to that of FIG. 2. These grids may be used with or without backing layers. Also these grids 15 can be constructed of an insulation material so that they will provide both insulation and waterproofing to the structure to be protected. The grids 15 may be water pervious or impervious. It is preferred that pockets as shown in 12 and 13 be used rather than prior art vertical convolutions because better grid support is provided. However, if vertical convolutions of any material were used, because of the cohesiveness of our material even these configurations would function. It is also preferred that each compartment or pockets 13 be in flow contact with each adjacent compartment as shown by channels 14 in FIG. 5. This is particularly desirable because it improves surface contact between waterproofing composition and the structure to be protected. The composition 9 therefore can be deposited in each compartment 13 and will extend and connect with (via channels 14) the adjacent compartments. It is preferred that each of the configurations shown in FIGS. 1-7 herein have these flow channels 14; they are not shown in all the figures herein for the sake of illustrative clarity. Any suitable grid configuration other than those specifically illustrated in FIGS. 1-7 may be used if both faces are open.

FIG. 6 is an end elevational view taken along line A-A of FIG. 2 of the grid configuration 10 shown in FIGS. 1 and 2. Masonry wall 2 or other structure to be waterproofed is contacted with waterproofing structure or grid 10. Open face 4 having waterproofing material 9 in direct surface-to-surface contact with the raised pocket sides 17 form the pocket 8 into which the composition or waterproofing material 9 is deposited. Waterproofing material 9 is exposed to the atmosphere on both faces 4 and 5 of grid 10. The material 9 thereby is in maximum exposure to masonry wall 2 and provides near optimum protection. This double open face, i.e. faces 4 and 5 may be provided with any grid formation shown in the drawings or defined and alluded to in the disclosure herein. Grid 10 may be constructed of any suitable water pervious or impervious material such as rubber, plastic, both solid and cellular, paper or cardboard or any other wood product. The combination of (1) a two open faced grid, and (2) a self-sustaining waterproofing composition is necessary to provide the optimum waterproofing unit or structure of this invention. The open faced grid provides maximum or near maximum exposure of the material 9. The self-sustaining material 9 also provides near optimum waterproofing qualities and durability. In addition, because of its self-sustaining properties, it is not necessary to provide backing layers or closed faces to the grid 10.

FIG. 7 is an end elevational view similar to the structure of FIG. 6 except the structure of FIG. 7 has a backing layer 16 over the substantial backing area of grid 10. The backing layer 16 may be either water pervious or water impervious depending upon the desired result. It is preferred that no facing or backing layer be used in the structure of this invention; however, if for some reason one were desired, it could be used. The waterproofing composition 9, however, does not require any backing layer for its effectiveness. It will not fall or collapse like cardboard support bentonite structures disclosed in the prior art. The composition 9 of this invention will remain in its original position even after activation with water, whereas prior art compositions would fall from their original location because of deterioration of both the cardboard or paper structure and waterproofing material itself.

We claim:

1. A waterproofing unit adapted to be positioned against a structure to be protected comprising a containing grid sheet and a waterproofing composition positioned within said grid, said containing grid comprising a grid network of through compartments which are adjacent to each other and are open on both longitudinal surfaces, each of said compartments in flow contact with each adjacent compartments, said waterproofing composition is a film forming material which is deposited in each of said compartments and extending substantially through the surface area the thickness of said grid, said composition comprising at least 75% of a substantially unswelled bentonite and the remainder a film forming substance, said film forming material containing a member selected from the group consisting of dialkylphthalate, dialkyloxalate, sucrose acetate isobutyrate, glycerine and mixtures thereof, together with a material selected from the g roup consisting of polyalkylmethacrylate, cellulose acetate, polyvinylalcohol, polyvinylbutyral, and mixtures thereof.

2. The unit of claim 1 wherein said compartments have both horizontal and vertically disposed compartment walls.

3. The unit of claim 1 wherein said bentonite is substantially unswelled prior to formulation and retains substantially all of its original swelling properties after a solvent wetting.

4. The unit of claim 1 wherein said grid sheet has convolutions extending through the width of said grid sheet.

5. The unit of claim 1 wherein said grid sheet has a honeycomb compartment structure.

6. The unit of claim 1 wherein said grid sheet has a rectangular compartment structure.

7. The unit of claim 8 wherein said composition is exposed on both outer surfaces of said grid sheet.

8. A waterproofing unit adapted to be positioned against a structure to be protected comprising a support grid sheet and a waterproofing composition, said support grid sheet having a plurality of individually defined pores or compartments which extend through the thickness of said grid sheet, said sheet having at least one of its faces open to provide maximum surface exposure to the structure to be protected, said waterproofing composition being a film forming material which is self-sustaining and located in at least a portion of said compartments, substantially the entire surface of said sheet containing said composition adapted to contact the surface to be protected, said composition comprising at least 75 percent by weight of unswelled bentonite, the remainder said film-forming material, said film forming material containing a member selected from the group consisting of dialkylphthalate, dialkyloxalate, sucrose acetate isobutyrate, glycerine and mixtures thereof together with a material selected from the group consisting of polyalkylmethacrylate, cellulose acetate, polyvinylalcohol, polyvinylbutyral, and mixtures thereof.

\* \* \* \* \*